J. HARTNESS.
METAL WORKING MACHINE.
APPLICATION FILED DEC. 21, 1914.
1,198,632.
Patented Sept. 19, 1916.
12 SHEETS—SHEET 8.
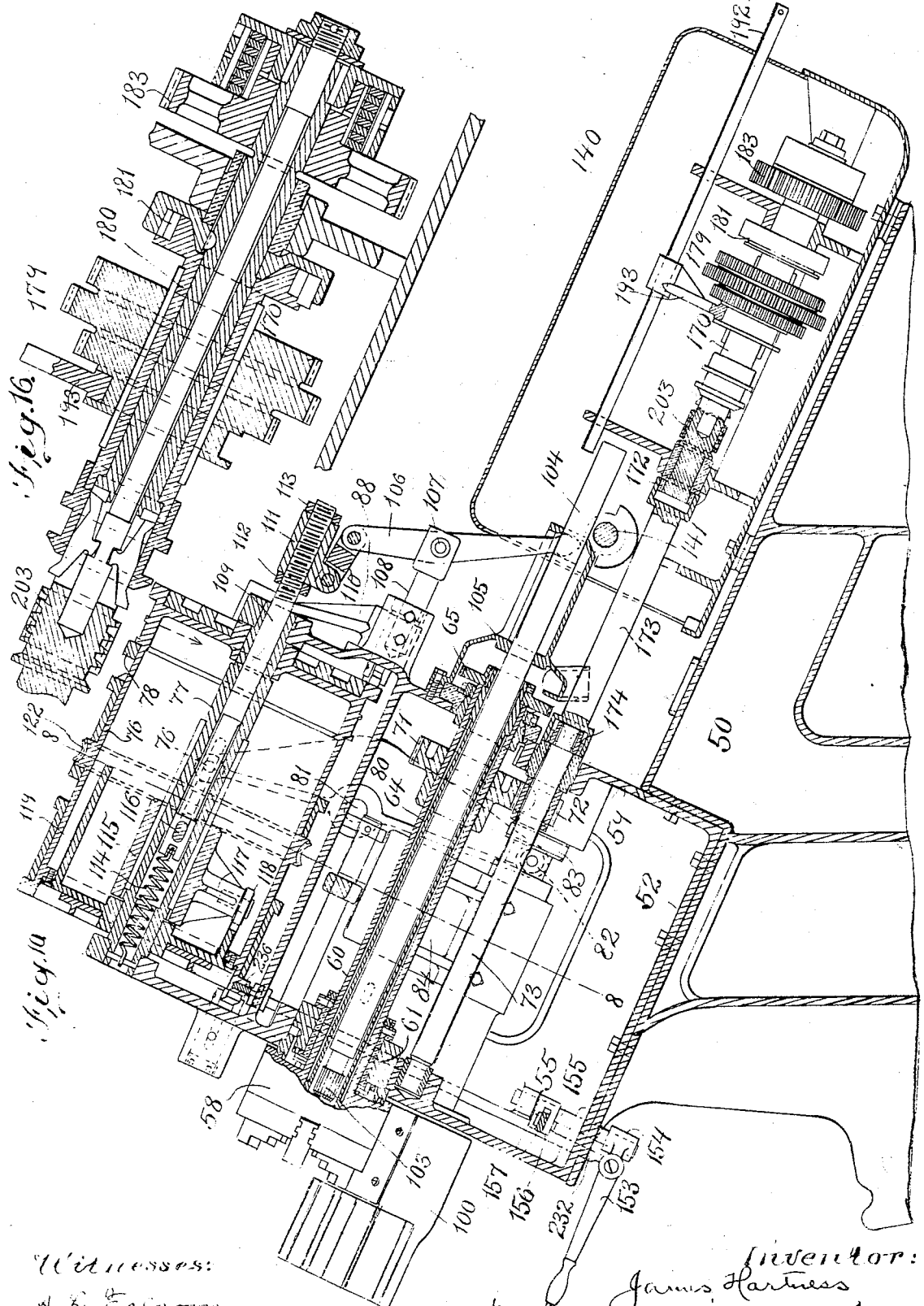

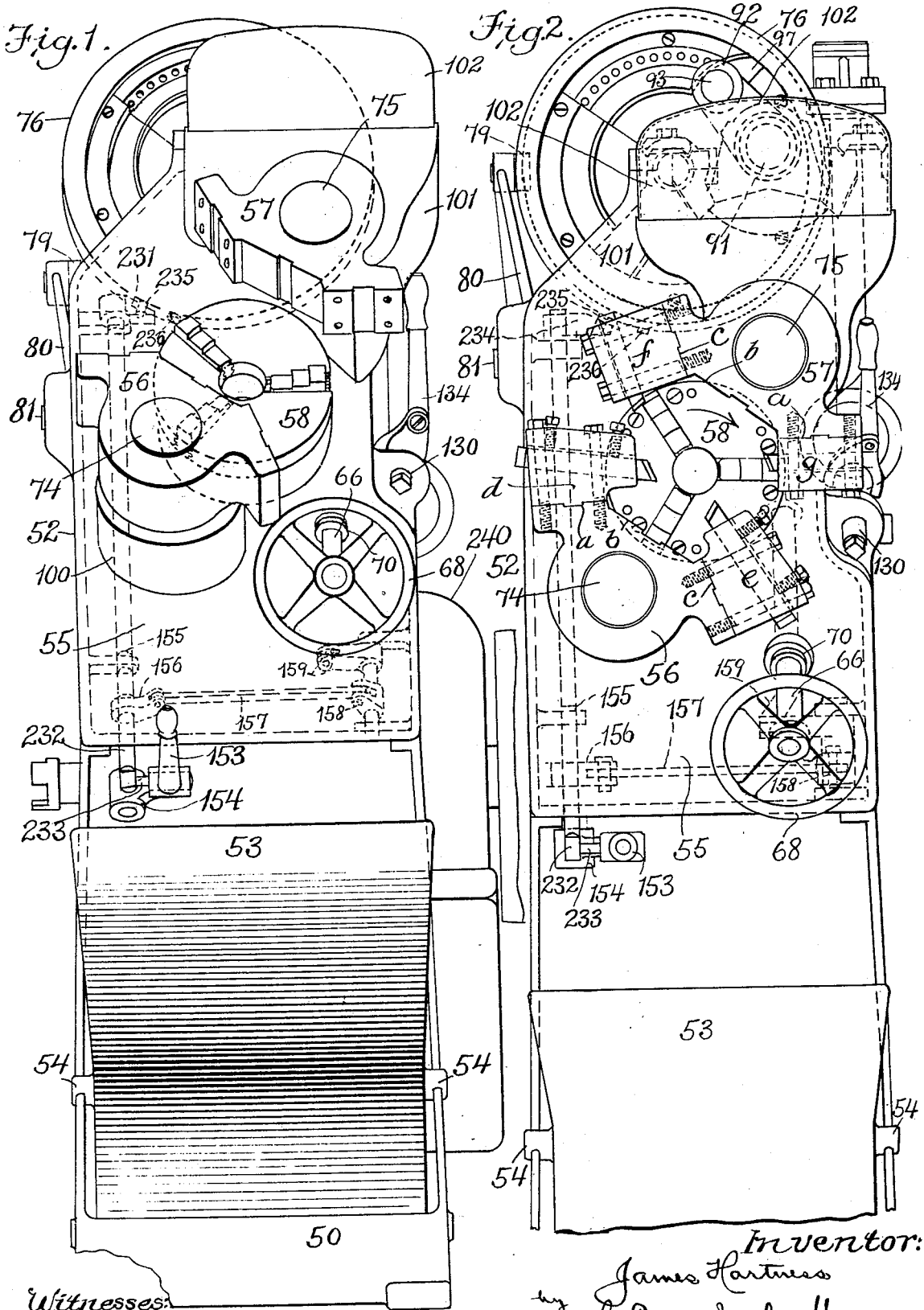

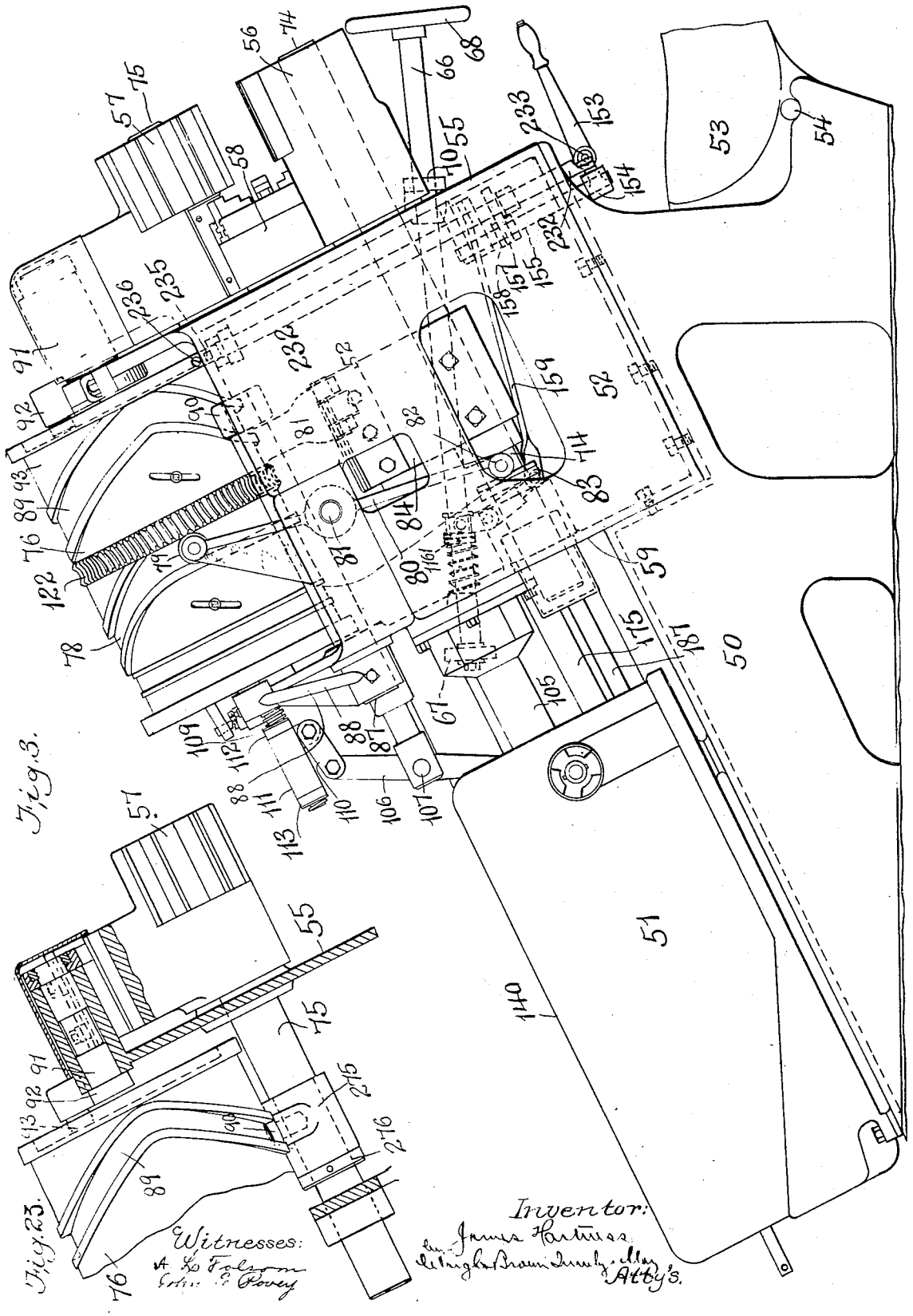

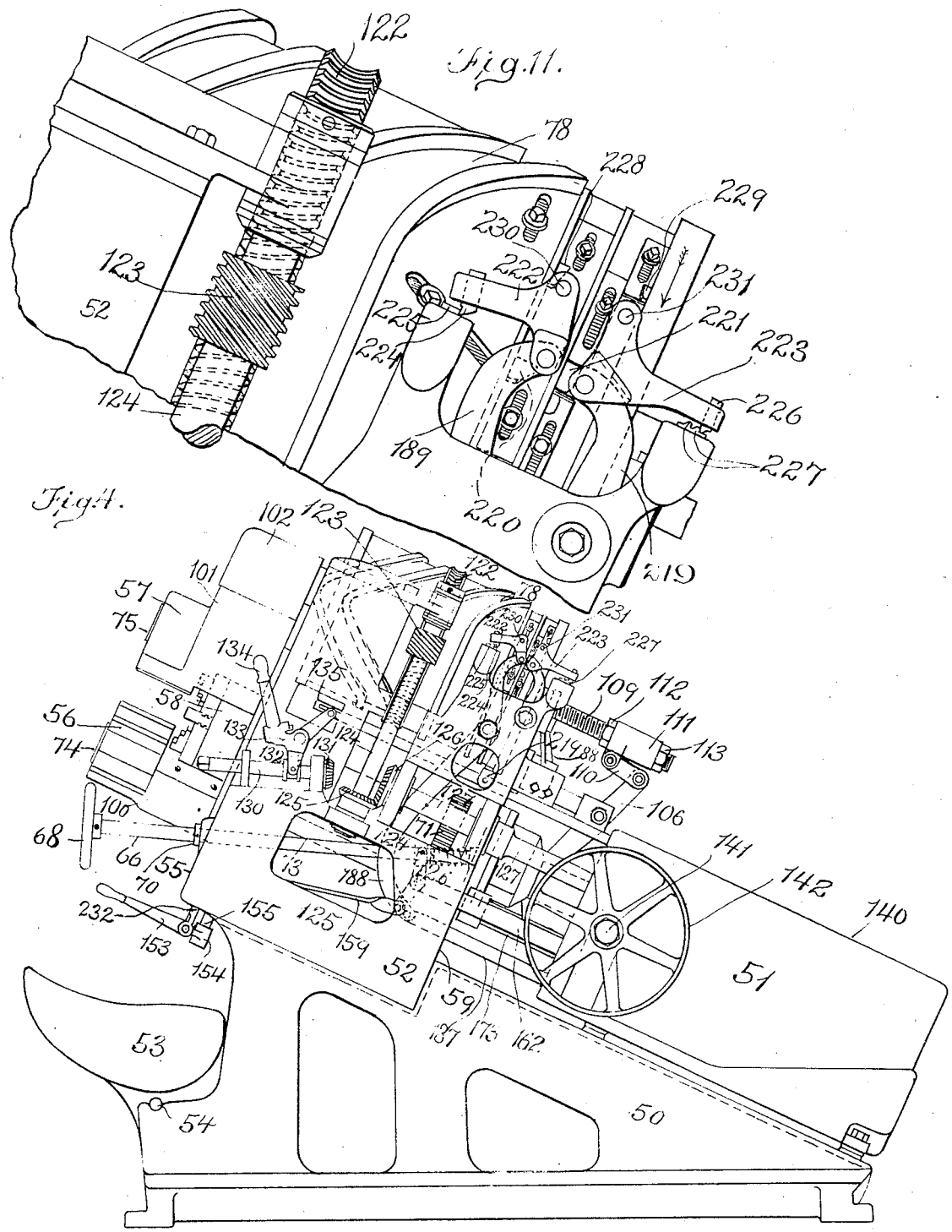

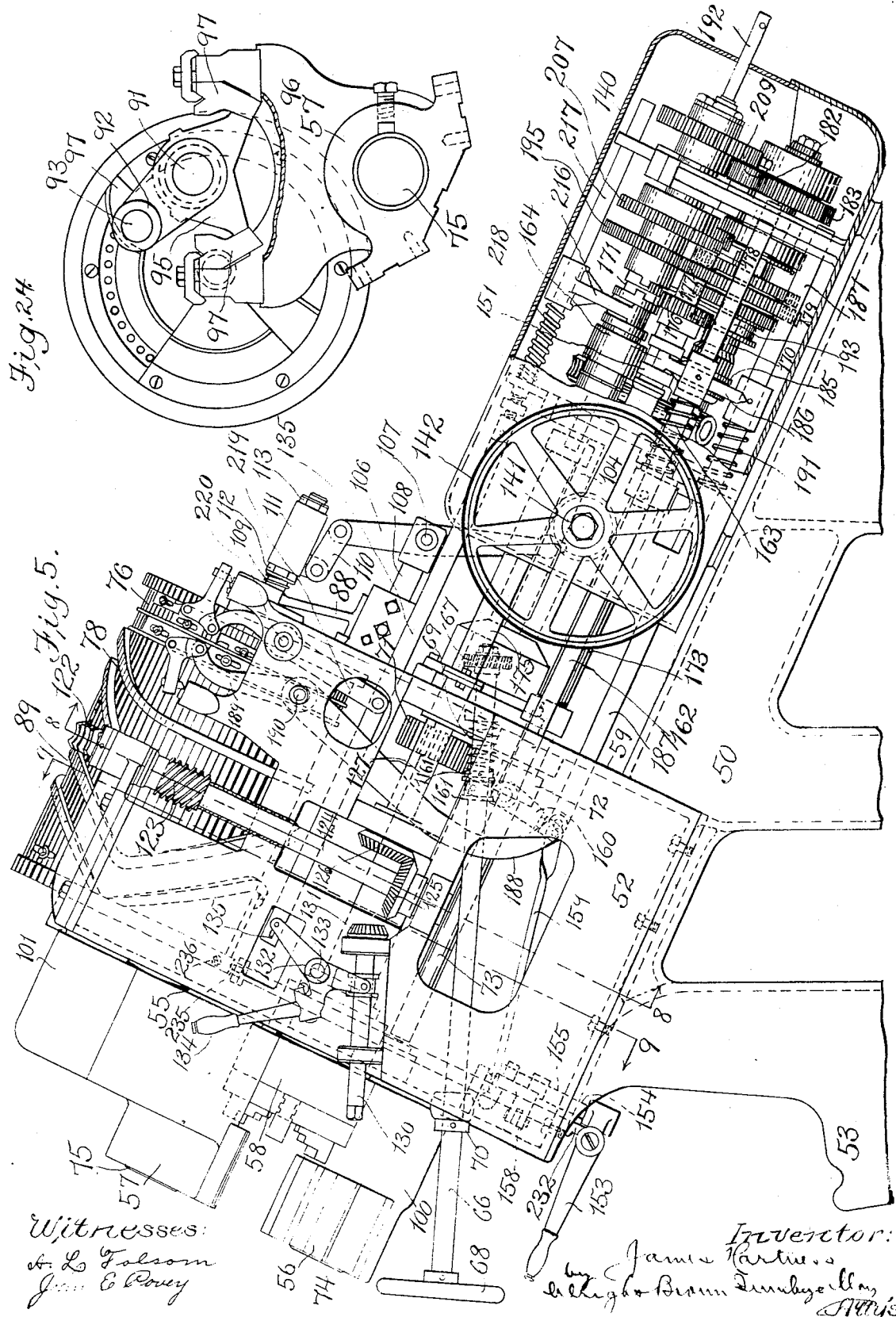

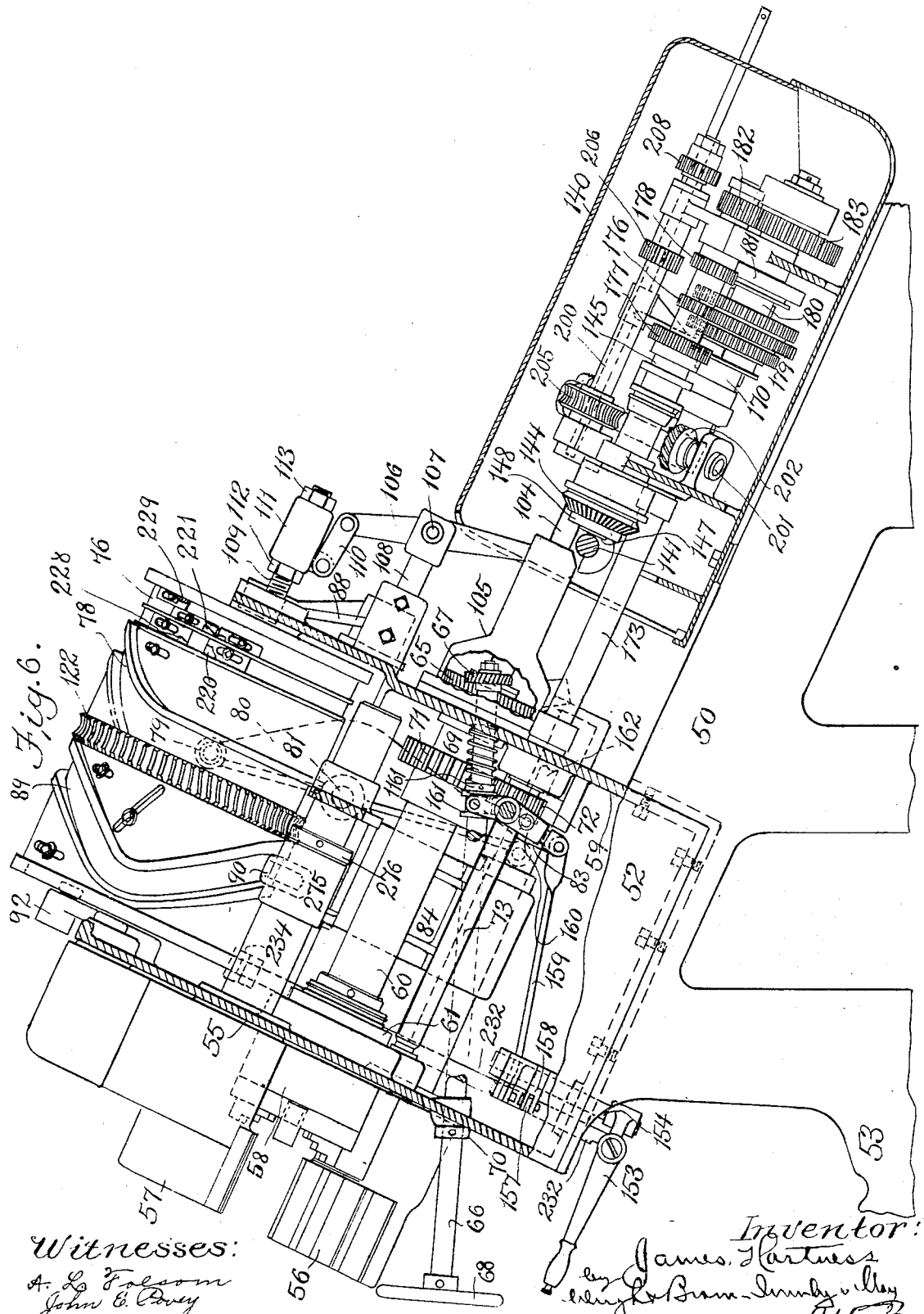

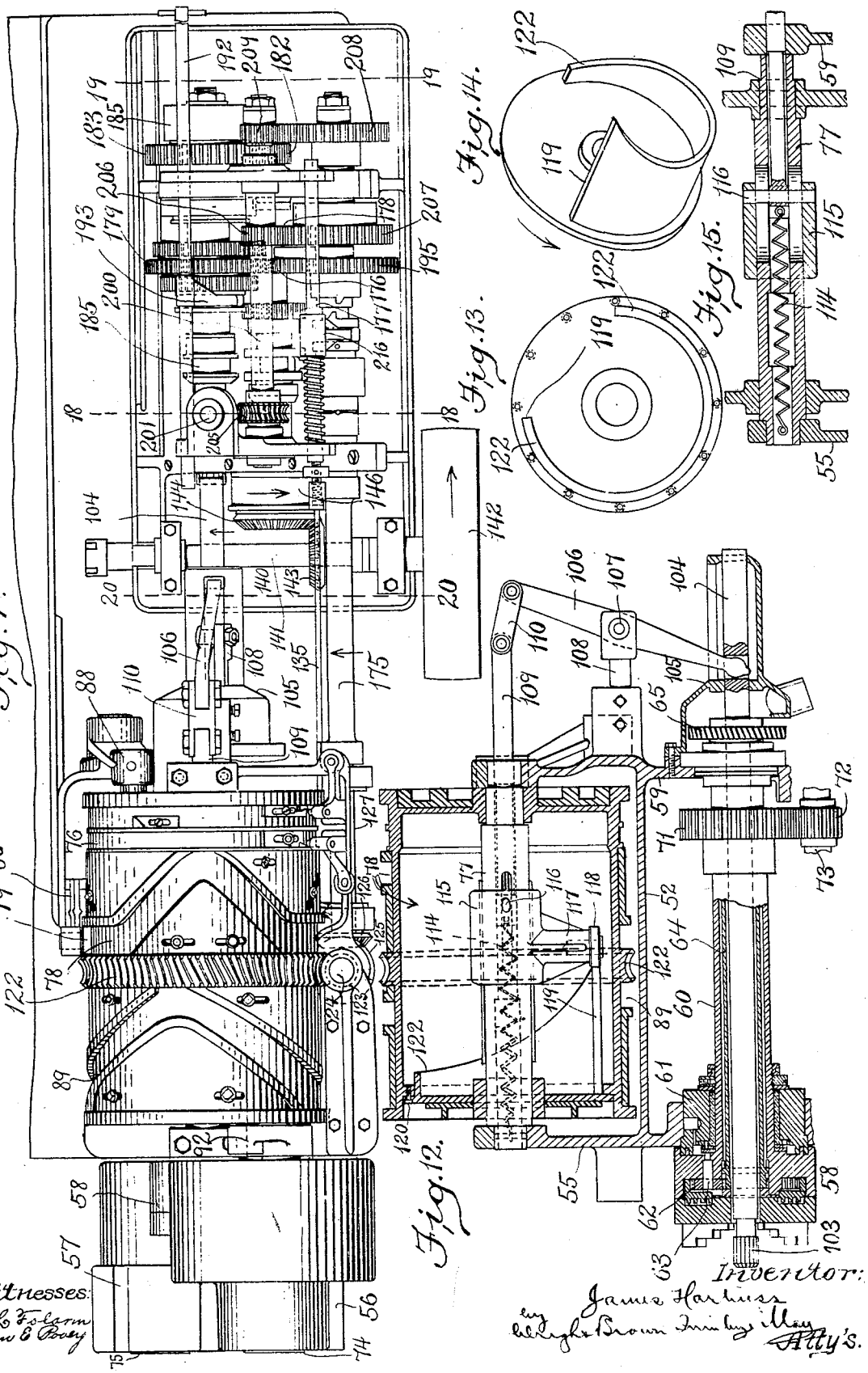

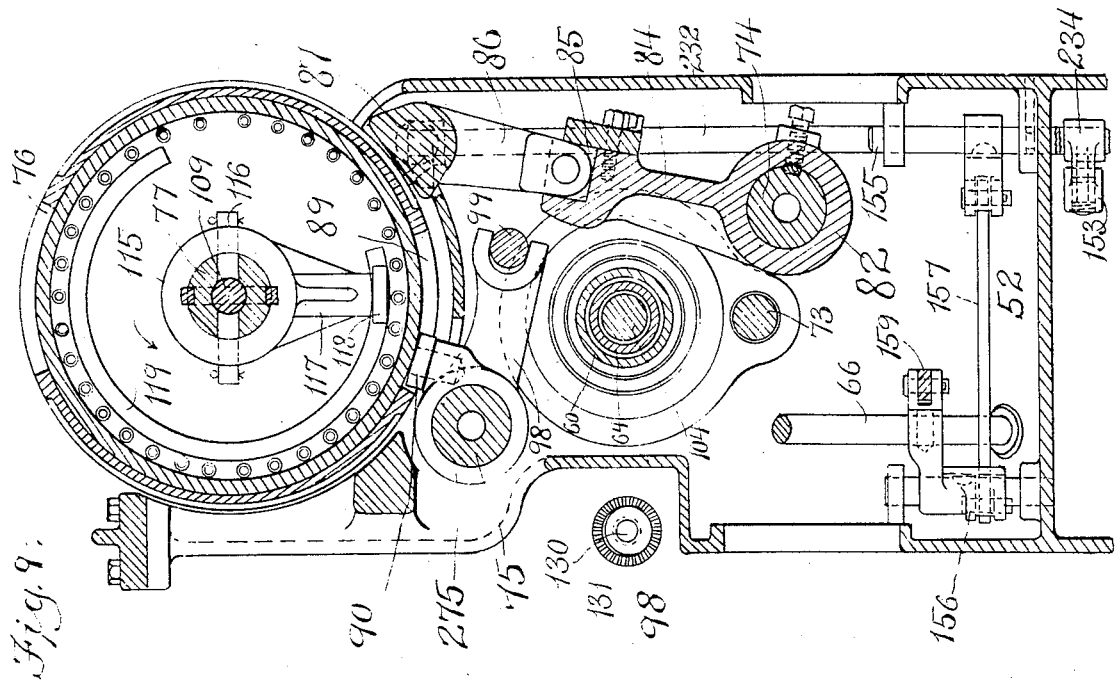
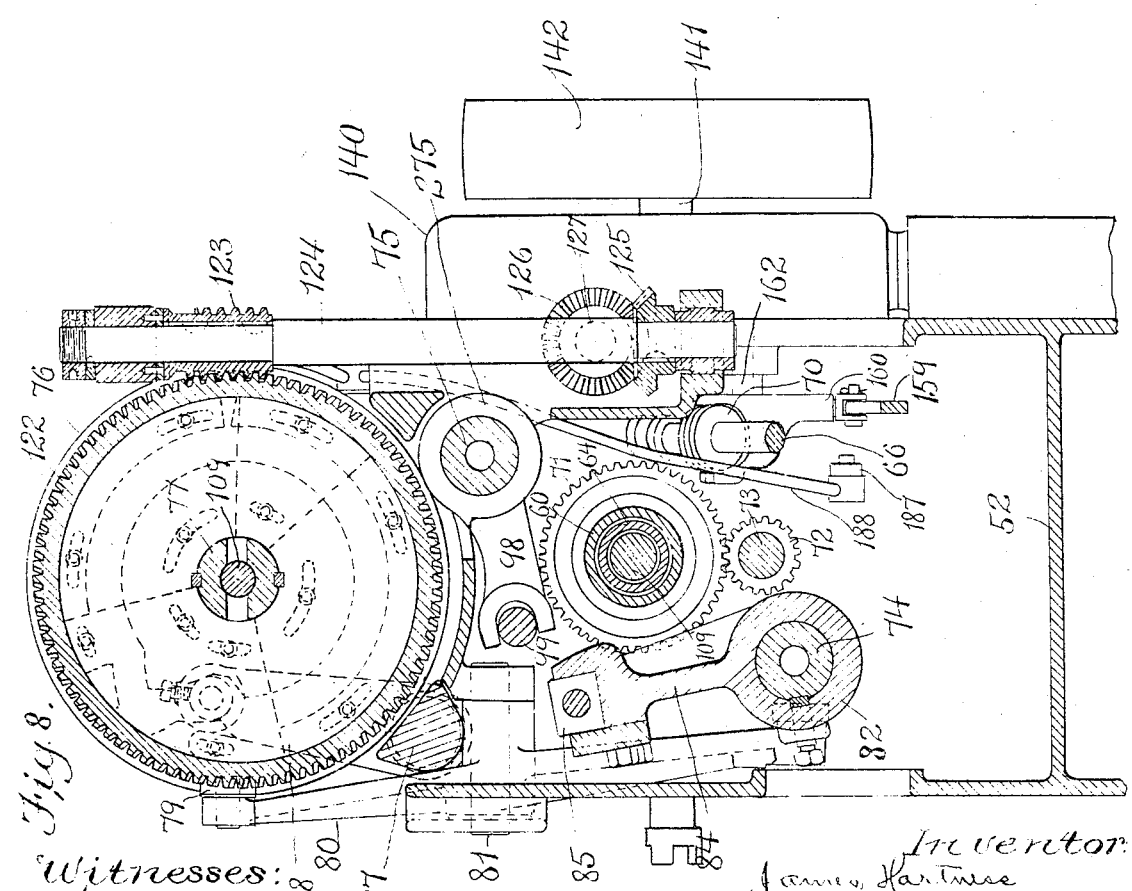

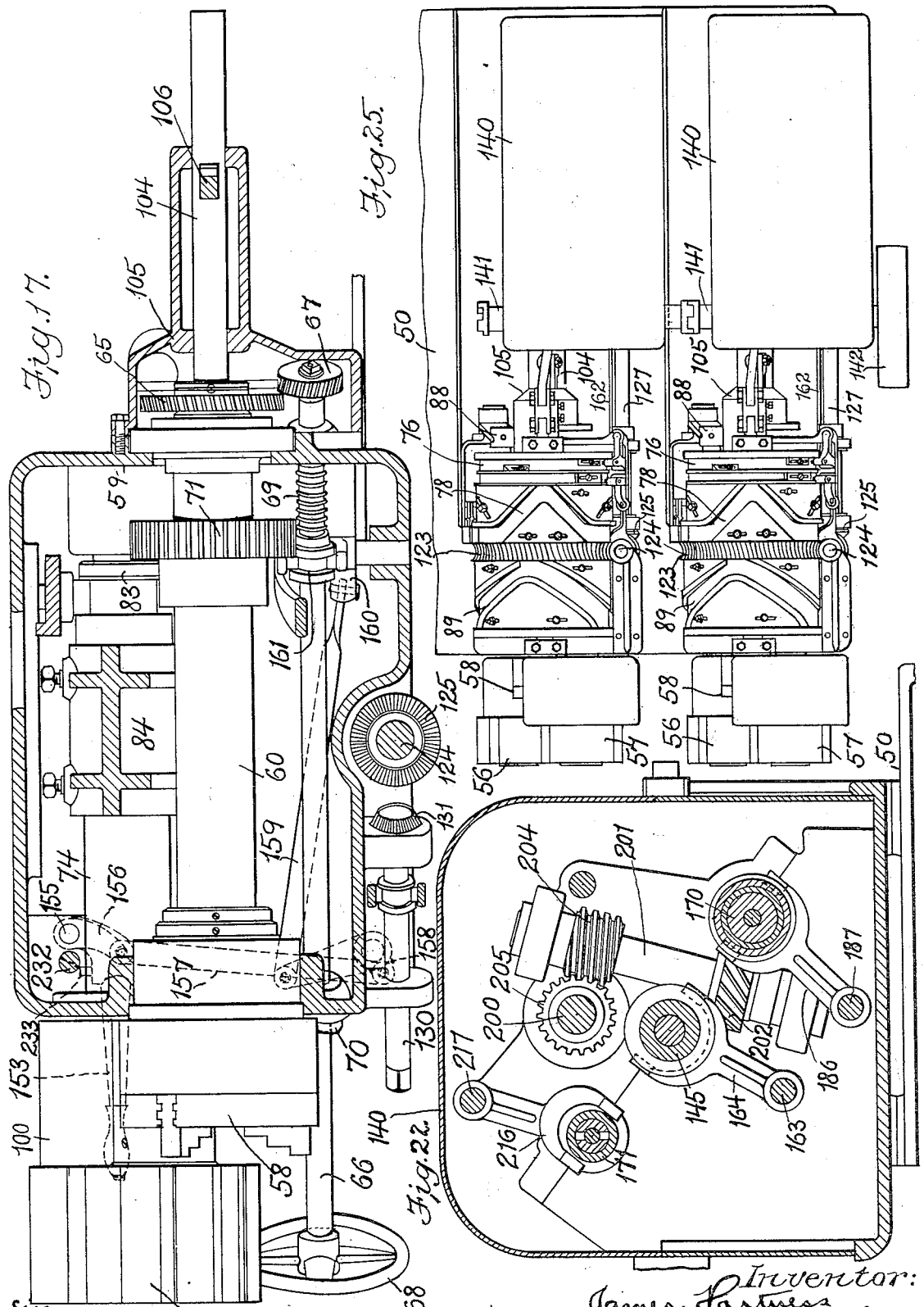

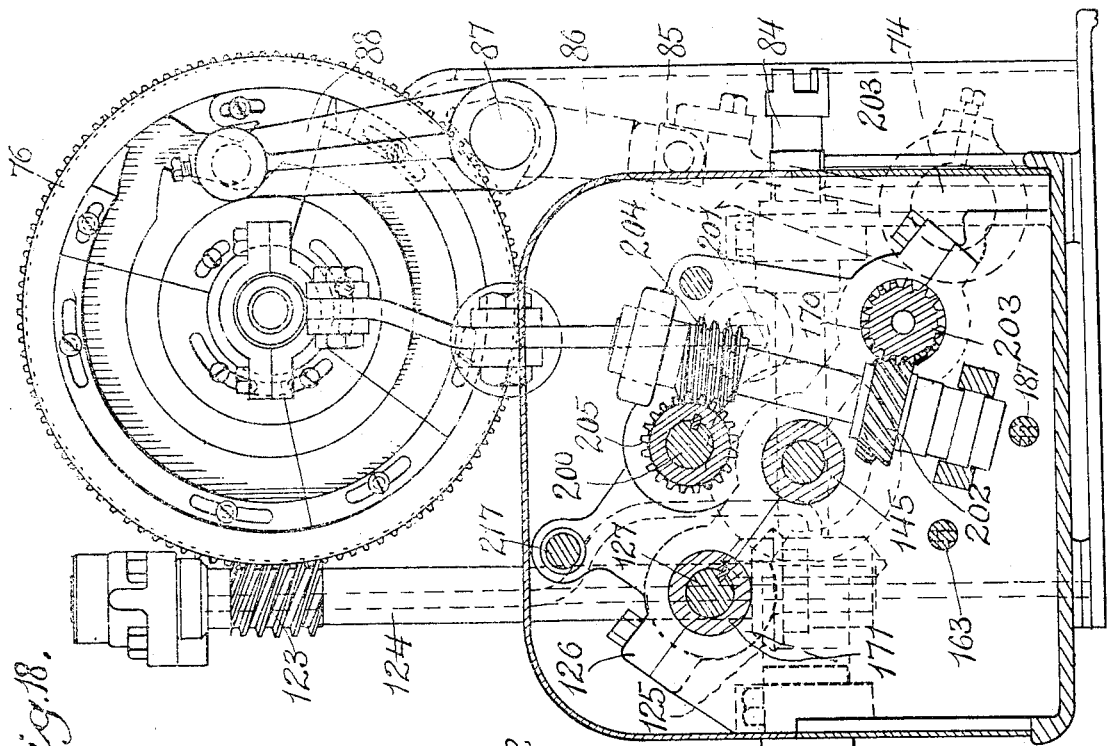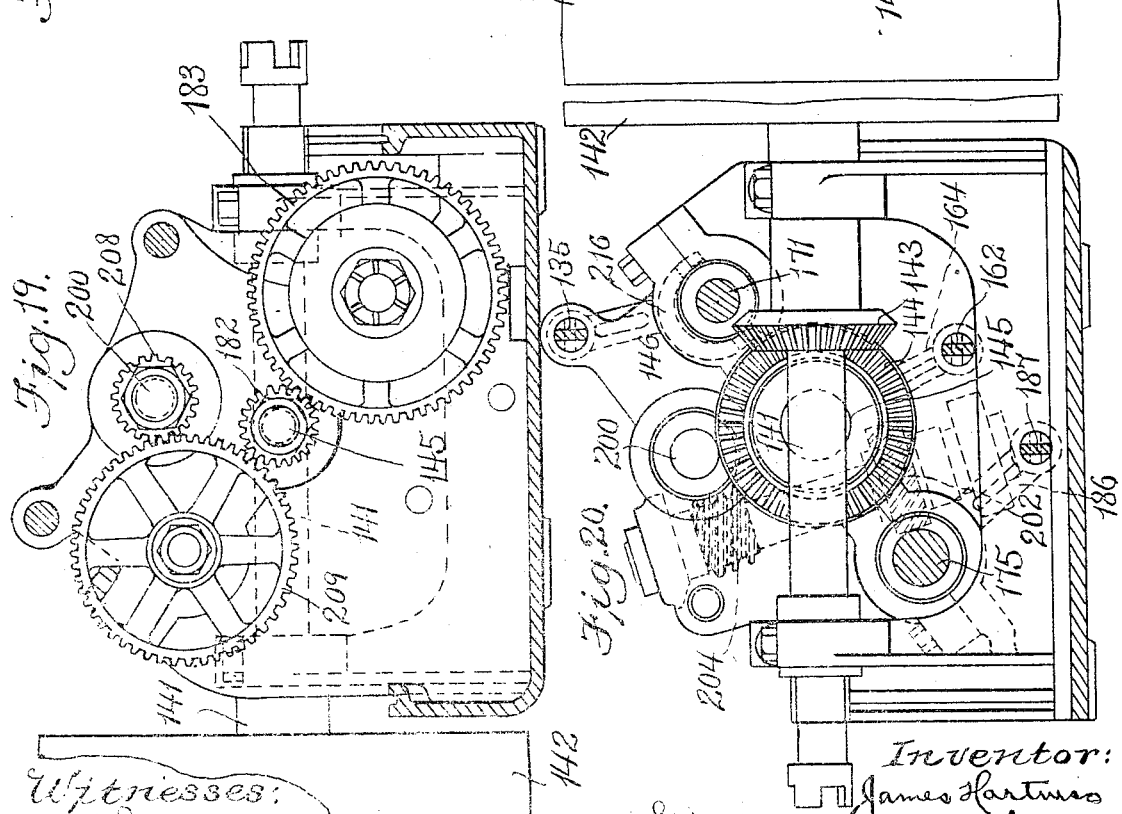

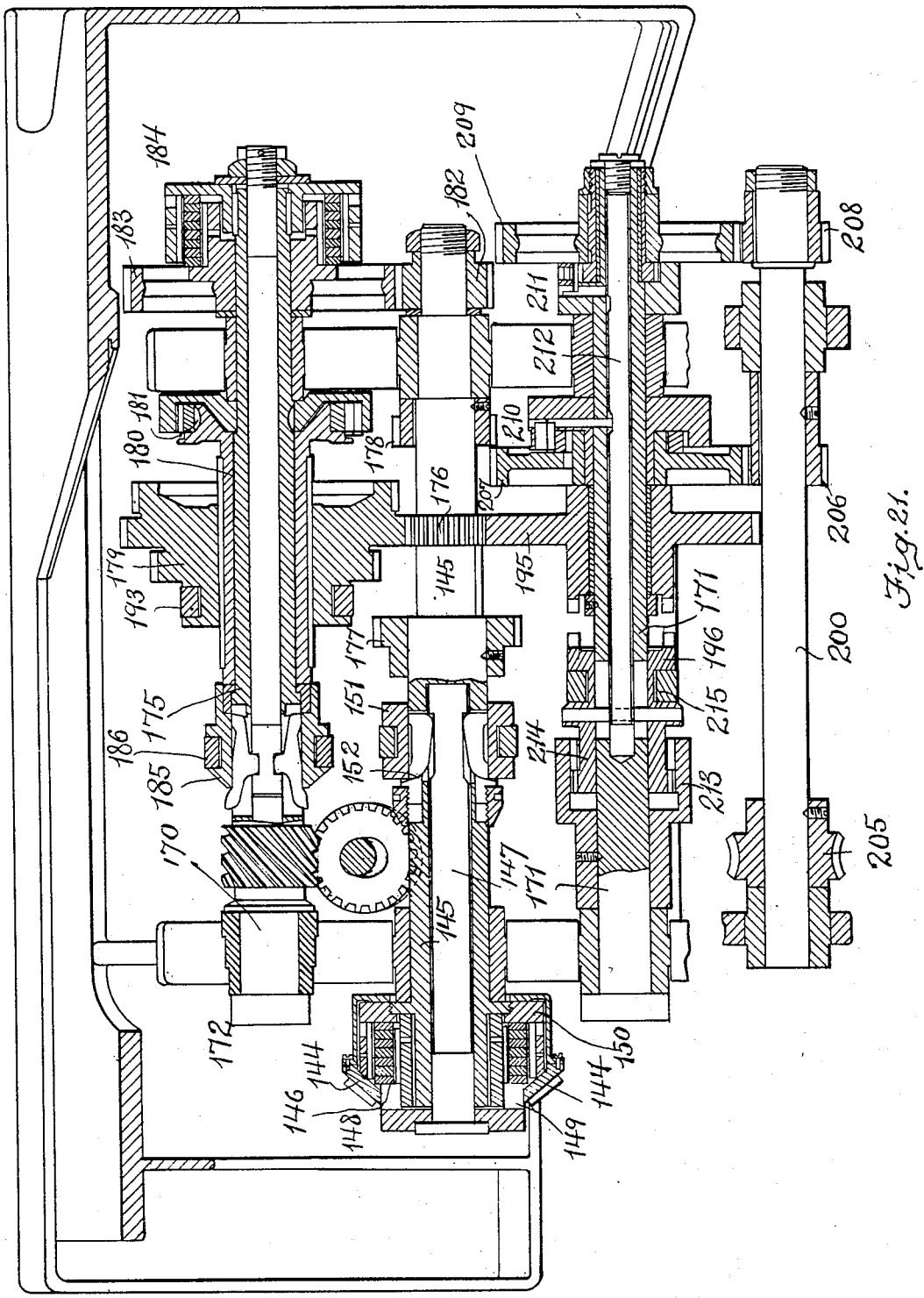

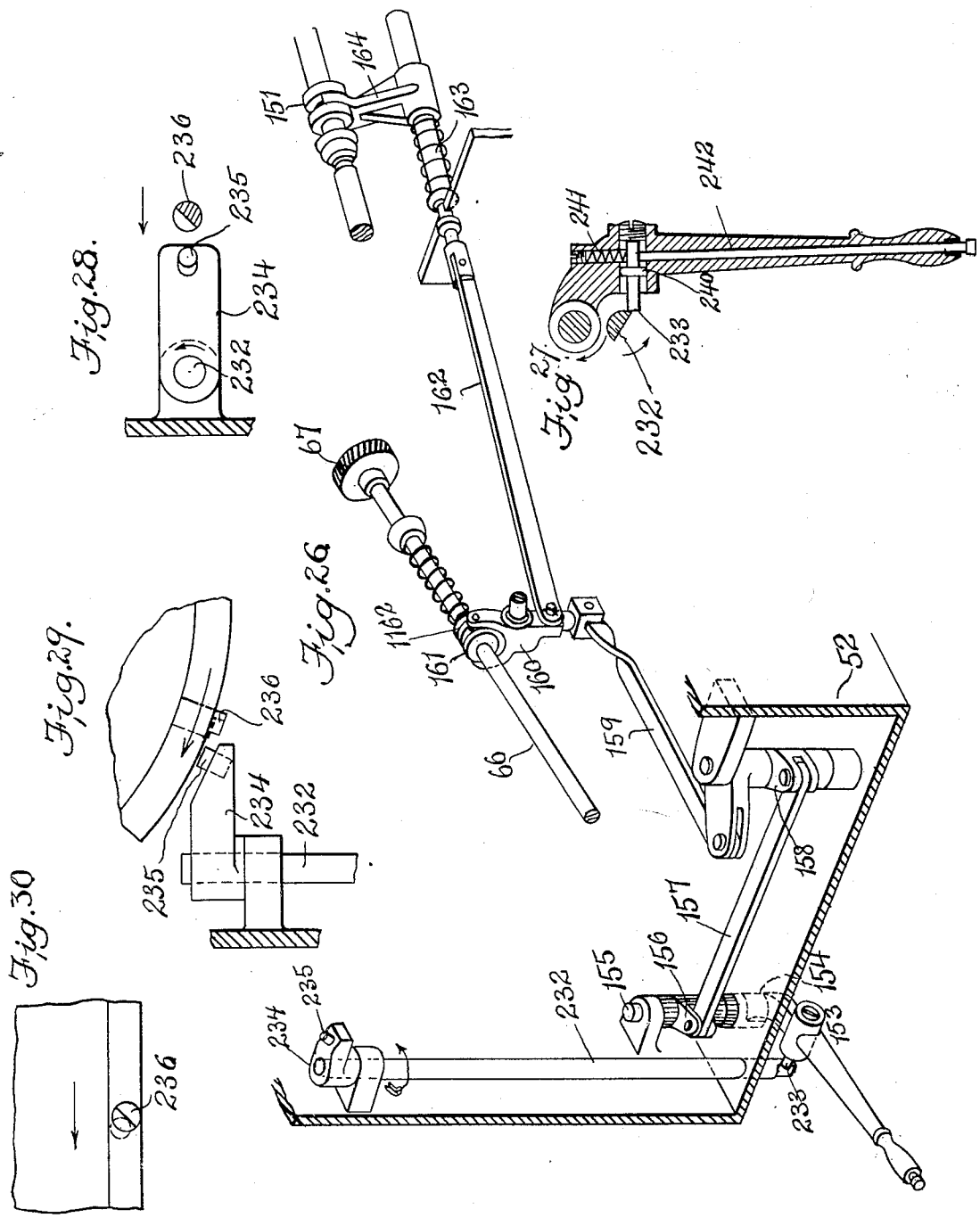

UNITED STATES PATENT OFFICE.

JAMES HARTNESS, OF SPRINGFIELD, VERMONT.

METAL-WORKING MACHINE.

1,198,632.
Specification of Letters Patent. Patented Sept. 19, 1916.

Application filed December 21, 1914. Serial No. 878,213.

*To all whom it may concern:*

Be it known that I, JAMES HARTNESS, a citizen of the United States, and a resident of Springfield, in the county of Windsor and State of Vermont, have invented certain new and useful Improvements in Metal-Working Machines, of which the following is a specification.

This invention has relation to metal-working machines which may be employed for performing a variety of operations, including forming, facing, turning, and the like, upon a piece of work held in a rotatable spindle or work holder, and relates more particularly to those machines which may be placed side by side and arranged in such manner as to present the work and the tool in position to be observed and inspected with convenience by the operator, as exemplified by the machine illustrated and described in my co-pending application, Serial No. 819,439, filed February 18, 1914.

The object of the present invention is to provide certain improvements in machines of the character referred to, by means of which each complete unit of the multiple machine may consist of two separable portions or components,—one including the work spindle and tool holders and the cams for controlling the operation of the unit, and the other including the variable speed mechanism by which the speed of rotation of the spindle and cams may be changed according to the requirements of the work.

A further object of the invention is to simplify the operative portions of the first-mentioned component or part of the unit and to arrange the various instrumentalities thereof so that they are convenient of access for adjustment and repair, and also to provide an improved power-transmitting and speed-changing mechanism of the second-mentioned component or portion of the unit, for securing the various graduations of speed that may be found convenient or necessary according to the finished piece of work that is to be produced.

The invention has further for its object to provide numerous other improvements in the construction and arrangement of the parts, all as will be fully explained in the following specification and pointed out in the appended claims.

Referring to the drawings, Figure 1 represents, in front elevation, one of the units of the machine. Fig. 2 is likewise a front view of the unit as it appears when looking at the same with the line of sight parallel with the axis of the work spindle. Fig. 3 represents an elevation of the machine, looking from the right side. Fig. 4 represents a like elevation, looking from the left side. Fig. 5 is a right-hand side elevation, on a larger scale, with a part of the base broken away and with some of the parts in section. Fig. 6 represents a longitudinal section through the unit. Fig. 7 represents a plan view of one of the units with the cover of the gear box removed. Figs. 8 and 9 represent cross sections through the machine, on the lines 8—8 and 9—9 of Fig. 5, looking in the direction of the arrows. Fig. 10 represents a longitudinal section through the machine on the vertical plane of the spindle axis. Fig. 11 (Sheet 3) illustrates the latching mechanism for the variable speed controllers. Fig. 12 (Sheet 6) illustrates the work spindle, the cam drum, and the mechanism for operating a reamer or other like tool. Figs. 13 and 14 illustrate the internal cam on the drum for operating the reamer. Fig. 15 represents a longitudinal section through the shaft on which the cam drum is mounted to rotate. Fig. 16 (Sheet 8) represents a longitudinal section through the shaft in the gear box and the parts thereon by which power is transmitted to the work spindle. Fig. 17 illustrates a horizontal section on a plane parallel to and above the work spindle. Fig. 18 represents a transverse section taken through the gear box, on the line 18—18 of Fig. 7. Fig. 19 represents in rear end elevation the mechanism contained in the gear box, being in effect a section on the line 19—19 of Fig. 7. Fig. 20 represents a front elevation of the same as seen from a plane indicated by the line 20—20 of Fig. 7. Fig. 21 illustrates a development of the gearing in the gear box. Fig. 22 (Sheet 9) illustrates a section through the gear box to show the clutch-shifting yokes. Fig. 23 (Sheet 2) and Fig. 24 (Sheet 4) illustrate the mechanism for oscillating and reciprocating one of the tool carriers. Fig. 25 (Sheet 9) shows a plan view of a machine consisting of two complete units. Fig. 26 shows, detached, the knock-off mechanism. Fig. 27 shows in section the controller handle. Figs. 28, 29 and 30 show portions of the knock-off mechanism.

Before describing the machine which is illustrated upon the drawings, I desire to have it understood that the invention is capable of many embodiments, that the parts of the machine are shown more or less conventionally, and that the terms or phraseology which I hereafter employ are for purposes of description and not of limitation.

I have selected for illustration and description as an embodiment of the invention a machine which, considered as a single unit, is adapted to be arranged side by side with a number of like units and separably connected thereto, so that they may be all driven, if desired, by a single drive shaft formed in coupled sections. Each unit comprises two separable parts or components each supported upon a suitable base structure. One of the parts or components consists of a main frame and is provided with a work spindle and with tool carriers constructed and arranged to be oscillated or reciprocated, or both if desired, and with cams for controlling the operation of the tool carriers, and the speeds of rotation of the cam carrier and the work spindle. The other part or component consists of a gear box or casing provided with change speed mechanism, the clutches of which are controlled by cams on the main frame. Suitable couplings are provided for connecting the instrumentalities or the necessary operative parts of the two components.

Like the machine which is described in my copending application Serial No. 853,114, filed July 25, 1914, to which reference may be made, the work spindle is preferably arranged at an angle both to the vertical and to the horizontal, and extends downwardly and rearwardly from the front of the machine; and the tool carriers are located in close proximity to the work-holding member or chuck of the spindle in such manner as not to obstruct free access to and observation of the work and tool. According to the present arrangement, the gear box is placed in the rear of the main frame which carries the work holder and tool holder, and it, too, is arranged so that the shafts therein, with the exception of the cross shaft, are in lines parallel to the axis of the work spindle.

*The bed structure.*—Referring now to the drawings, and more particularly to Fig. 4, the machine there shown consists of a unit comprising a bed or base 50, a gear box 51, and a main frame 52. The bed or base is provided with a bottom portion adapted to rest upon the floor and forming a shallow pan to receive lubricant dripping from the bearings, and with upright side walls suitably braced by cross webs or braces which it is unnecessary to describe in detail. The top of the base slopes downwardly and rearwardly from the front of the machine, at an angle of about thirty degrees to the horizontal, and placed thereon are the main frame 52 and the gear box 51, so that these two component parts of the machine are maintained at an inclination to the horizontal. By substituting a base having its top horizontal, the frame and the gear box may be likewise maintained in horizontal position, as will be readily appreciated. Between the side walls of the base is hung a chip receptacle 53 by means of trunnions 54 projecting laterally from the receptacle. This receptacle is located underneath what I may term the bed plate of the frame, so as to receive chips sliding therefrom. This receptacle is so weighted and pivoted that it normally occupies the position shown in Fig. 4, to receive chips, but it may be swung about the axis of the trunnions so as to discharge the collected chips into a cart. In side elevation it possesses the general appearance of a coal-hod; but its particular shape is immaterial. The base may be made wide enough to receive a plurality of machine units, or may be made in separate sections, one for each unit.

*The main frame.*—I will now describe the main frame and the instrumentalities supported thereby, including the work spindle, the tool holders, the cam carrier, etc. The main frame of each unit is box-like in structure, being formed with a front bedplate 55, which, by reason of the inclination of the frame, is at an angle of approximately sixty degrees to the horizontal, extending downwardly and forwardly from the top thereof. In the front of this bed plate are located the tool holders 56 and 57 and the chuck 58. The side walls of the frame are apertured to permit access to the mechanism which is arranged in the interior thereof. Parallel to the bedplate and in the rear thereof is the rear wall 59,—the front wall or bedplate and the rear wall according support for the bearings in which are journaled the spindle and the tool-holder slides.

The chuck 58 is mounted upon the hollow work spindle 60 which is journaled in bearings in the walls 55 and 59, as shown in Fig. 10. The rear face of the chuck is formed with tongues and grooves complemental to similar tongues and grooves formed on the front bearing 61 so as to prevent access of chips and cuttings to the bearing. For convenience, I employ a scroll chuck such as is described and shown in Letters Patent No. 1,084,546, issued to me on the 13th day of January, 1914, in which the scroll 62 is rotated by one or more pinions 63 and engaged with teeth on the end of an internal sleeve 64. This sleeve extends through the work spindle, and on its rear end is provided with a spiral gear 65. I employ means which may be engaged with the gear 65, when the spindle is at rest, to rotate the sleeve 64 and open or close the jaws of the chuck, as the case may be. To this end, I employ a shaft 66 which is slidably mounted in bearings and projects through the end wall of the frame (see Figs. 6, 17 and 26). On its rear end, this shaft is provided with a spiral gear pinion 67 and on its front end with a hand wheel 68. A spring 69 tends to move the shaft forward to cause the gear 67 to mesh with the gear 65. The operator, after the shaft 66 has been moved forward by the spring 69 to cause the gear 67 to mesh with that at 65, may then rotate the hand wheel 68 to open or close the chuck jaws. The shaft 66 has a collar 70 which limits the rearward sliding movement thereof against the tension of the spring 69. By mechanism, which I will subsequently explain, the shaft 66 is connected with the main clutch in the gear box so that the shaft cannot be shifted by the spring except when the main clutch is in inactive position.

Referring again to the work spindle 60, it will be seen from Figs. 10 and 12 that it is provided intermediate of its ends with a gear 71 which intermeshes with and is driven by a pinion 72 on what for convenience I term the spindle shaft 73 arranged in parallelism with and below the spindle. To this shaft power is transmitted by a suitable coupling member connected with what I term the spindle-driving shaft in the gear box. I will not at this time, however, explain the mechanism by which power is transmitted to the intermediate shaft 73.

*The tool carriers.*—The tool carriers may be two in number, as previously indicated, and they are located diametrically on opposite sides of the chuck, as shown in Figs. 1 and 2. These tool carriers are substantially of the form of those illustrated and described in my copending application, Serial No. 819,439, hereinbefore mentioned, and they are preferably capable of both axial and oscillatory movement. Each tool holder is preferably formed with three tool-receiving faces, as indicated at a, b and c. The face b intersects the plane of the axes of the work spindle and the tool carrier, and the faces a and c may be arranged at an obtuse angle to the face b. Upon these faces are secured suitable tools, such for example as indicated at d, e, f and g. On moving the tool carrier 56 to the left, or anti-clockwise, the cutter of the tool e may be brought into potential cutting position and be there held while the tool holder is reciprocated axially, for the purpose of turning the periphery of a piece of work, after which the tool holder may be moved in the opposite direction to remove the cutter from the work. Thereafter, by swinging the tool holder clockwise, the cutter of tool d may be brought into potential working position and there held while the tool holder is axially reciprocated to finish the periphery of the work previously cut, or else to turn another portion of the periphery of the work. This description of the operation of the tool holder 56 may be equally true of the tool holder 57. The operation of the tool holders, however, depends upon the character of the cams which are used for controlling them, these cams being so arranged as to cause the cutters to perform their allotted functions in any desired sequence. The turning cutters, illustrated on Fig. 2, may be replaced either by forming cutters or by cutters for facing the work. The two tool holders may be operated simultaneously or in sequence during one complete rotation of the cam carrier. They may be both oscillated and reciprocated, or on the other hand, one may be oscillated and reciprocated and the other merely oscillated in case the cutter or cutters thereon are employed only for facing or forming operations. On the faces b of the tool holders may be located the tools for internal cutting, for boring, reaming or the like, according to the operation to be performed upon the piece of work.

The tool holder 56 is rigidly secured upon a cylindrical slide bar 74, and the tool holder 57 is similarly secured upon a slide bar 75. These two slide bars extend through the bed plate of the frame in parallelism with the work spindle. Motion is imparted to them from cams located upon a suitable cam carrier, such for example as a drum 76. This drum, as shown in Fig. 10, is journaled upon a fixed shaft 77 mounted in upward extensions of the front and rear walls 55, 59 of the frame. On its periphery, the drum is provided with cams 78 for engaging a roll 79 on one end of a two-armed lever 80 upon a stud 81 and having on its lower bifurcated end rolls 82 extending into a peripheral groove in the slide bar 74, as shown in Figs. 3 and 8. The oscillation of the lever 80 effects the axial reciprocation of the slide bar 74 and of the tool holder 56. The peripheral groove in the slide bar may be formed by reducing the diameter of the rear end of the slide bar and securing thereon a collar 83, as shown by Fig. 10. For the purpose of oscillating the slide bar, there is rigidly secured thereto an arm 84 (see Fig. 9), the end of which is yoked to form a slideway for a block 85 pivoted upon the end of an arm 86 depending from a rockshaft 87. This rockshaft is parallel with the drum, and on its rear end, which projects beyond the rear end wall of the frame, there is an arm 88 which is rocked in one direction or the other by cams located on the rear end of the drum 76. When the arm 88 is rocked in one direction or the other, the slide bar 74 is rocked through the arms 84, 86, irrespective of the extent to which the slide bar 74 may have been moved axially. I have not shown in exact form the cams on the rear end of the cam drum for effecting the oscillation of the tool holder 56, as these will, of course, vary with the operations to be performed by the tools, as I have previously explained; but, in any case, the tool holder is first rocked in one direction or the other to bring the proper tool into potential cutting relation with the work and is thereafter further oscillated to cross-feed the tool if a facing or forming operation is being performed, or is held in potential cutting relation while the tool holder is length fed for performing a turning operation, and, in either case, is subsequently oscillated in the opposite direction to return the cutter to its inactive or neutral position. By providing the cam-operated rockshaft 87 and the engaging arms 86 and 84, I am able to secure an oscillatory movement of sufficient length to face work of any reasonable diameter suitable to be held in the chuck.

The mechanism for reciprocating and oscillating the tool holder 57 is somewhat different from that which I have just described, and is operated by cams located on the cam drum or carrier. The axially reciprocatory movement of the tool slide 75 is secured by path cams 89, illustrated conventionally upon the drawings and engaging the roll 90 located on a stud projecting inwardly from a rotatively loose collar 275 held against rotative axial movement on the slide bar 75 by a collar 276. The oscillation of the tool holder, however, is secured by means of a rockshaft 91 having an arm 92 with a roll 93 adapted to be engaged by cams located on the front end of the cam drum or carrier as conventionally illustrated at 94, see Figs. 23 and 24. This rockshaft projects through the upward extension of the bedplate 55 and is provided with a cam member 95 having a series of pairs of diametrically opposite cam faces. Said cam member projects between the two arms of a yoke 96 which are formed integrally with the tool holder 57. These yoke arms are elongated longitudinally of the axis of the tool holder 57 and are provided with wear blocks 97 for coöperation with the several pairs of cam faces on the cam member. Said wear blocks constitute guides for permitting the axial movement of the tool holder, as for instance when the cutters upon the tool holder are performing the operation of turning. In my copending application, I have described more in detail the construction and mode of operation of the mechanism thus briefly referred to. The tool holder in the present case is mounted to swing with the slide bar 75, and the sleeve 275 is held against oscillation by an arm 98 having a yoked end straddling a guide bar 99, as shown in Figs. 7 and 8. The tool holders are formed with hoods 100, 101 which overlap bearings formed on and projecting forwardly from the bedplate, and in addition the tool holder 57 is provided with a hood or casing 102 which incloses the cam member that is engaged with the yoke on said tool holder.

*Supplemental tool holder.*—I find it convenient to use a reamer or other form of tool, which may be withdrawn into the spindle, for performing operations upon the interior of a piece of work held in the chuck. In Fig. 10, I have illustrated the tool at 103 as a reamer, and it is mounted in the end of a slide or supplemental tool carrier 104 which is located inside of the spindle 60 and which projects rearwardly from the spindle through a housing 105 which covers and protects the spiral gear 65 to which reference has already been made. This slide 104 is reciprocated by cams carried by the cam drum or carrier. For this purpose I may use a two-armed lever 106 pivoted at 107 on a stud 108 projecting rearwardly from the rear wall of the main frame. The upper end of this lever 106 is connected with a slide 109 in any suitable way. I have shown two forms of connection. In Figs. 7 and 12, the end of the slide 109 is connected with the lever 106 by a link 110, whereas, in Figs. 3 and 10, the link 110 is pivoted to a sleeve 111 which is placed upon the end of the bar 109. The end of the bar is threaded to receive two collars 112, 113 which may be adjusted to locate the sleeve at any desired point of adjustment. The bar 109 extends through the stationary shaft 77 on which the drum or carrier is mounted, and is normally drawn forwardly by spring 114 (see Figs. 10, 12 and 15). On the shaft 77 there is mounted a sleeve 115 which is connected to the slide 109 by a cross pin 116 passing through slots in shaft 77. The sleeve 115 has a radial arm 117 carrying upon its end a roller 118 engaged with a cam 119 secured to the forward end 120 of the cam drum or carrier 76 and extending into the interior of said drum. It will be apparent that, when the cam carrier is rotated, the sleeve 115 will be moved against the tension of the spring 114 so as to move the slide 109 rearwardly by the lever 106 to advance the slide 104 with the tool thereon into position to cause the tool to act upon the work. In lieu of a reamer, any other form of tool which may be used may be substituted therefor, and other suitable mechanism for operating the supplemental tool may be employed. The cam drum or carrier is rotated at different speeds transmitted thereto from the gear box. It is formed with worm teeth 122 at any convenient point in its periphery with which is engaged a worm 123 located upon an upright shaft 124 on the left side of the frame. This shaft is mounted in conveniently located bearings and is provided with a bevel gear 125 with which meshes a bevel gear 126 on what for convenience I term the cam shaft 127. The shaft 127 is parallel to the axis of the work spindle and it projects rearwardly through the rear wall of the main frame, so that it can be coupled or connected to the cam-driving shaft in the gear box.

*Means for moving the cam drum manually.*—In camming the machine, as well as for other purposes, it is at times desirable to rotate the drum manually. For this purpose, I may employ a sliding shaft 130 on the right side of the machine, which, on its rear end, is provided with a bevel gear 131 which may be moved into engagement with the gear 125 on the shaft 124. Normally this shaft is slid forward to the position shown in Figs. 4 and 5, and it may be moved rearwardly by a three-armed lever 132 pivoted at 133. One arm of this lever is yoked to engage a collar on the shaft 130, while another arm is provided with a handle 134 by which the lever may be rocked about its fulcrum to slide the shaft 130 rearwardly. Any suitable form of latch mechanism may be utilized to hold the lever in active position. When the bevel gear 131 has been caused to mesh with the bevel gear 125, the shaft 130 may be rotated by a crank handle, wrench, or other suitable device, so as to rotate the cam shaft 124 and correspondingly rotate the drum and the cams thereon in one direction or the other. To insure safety to the operator, it is desirable to disconnect the drum from the drum-driving shaft in the gear box, and this is accomplished by a sliding controller rod 135 with which the third arm of the lever 132 has a pin-and-slot connection. This rod projects rearwardly through the rear wall of the main frame and is coupled to a clutch controller extending into the gear box. The pin-and-slot connection between the lever 132 and the slide 135 permits the slide to be moved back and forth for other purposes, as will be explained, but insures that the clutch on the cam-drum shaft in the gear box will be disconnected or inactive when the handle 134 of the lever 132 has been given the final forward movement which is necessary to permit intermeshing of the bevel gear 131 with the bevel gear 125.

*Gear box.*—I shall now describe the speed-changing mechanism which is contained within what I have termed the "gear box," and which is mounted upon the base of the machine so as to be detachable both therefrom and from the main frame and the parts mounted therein. The gear box consists of any suitable form of structure in which may be mounted the various shafts and trains of gears. As illustrated, it consists of a substantially oblong rectangular box having a removable cover, as shown at 51, the removable cover being indicated at 140. This casing rests upon the rearward slanting portion of the base 50 and is detachably secured thereto by bolts, screws or other convenient form of fastenings. Extending transversely through the casing and supported in suitable uprights or bearings is the prime power shaft 141, which is illustrated as being provided with a pulley 142 by which it may be driven at constant speed from any suitable source of power. The pulley is mounted upon one end of the shaft, and the other end is so formed that it may be coupled to a like shaft or shaft section in the next adjacent unit, see Fig. 25. Thus, when a plurality of units are placed side by side, all of the coupled sections of the shaft will receive power from the same source through the medium of the pulley 142. The shaft 141 is provided with a bevel gear 143 which intermeshes with and drives a bevel gear 144 located on what, for convenience, I term a "main driving shaft" 145 which extends longitudinally of the gear box and is journaled in suitable bearings therein. The bevel gear is mounted loosely on the shaft 145 but may be clutched thereto by any suitable clutch mechanism indicated as a whole at 146. As illustrated in Fig. 21, a disk clutch is shown, consisting of a slide bar 147 arranged in the shaft 145 and having on its end a head 148 which through pins 149 bears on the disks and causes the transmission of power to the shaft 145 through a collar 150 thereon. The rod 147 is moved by any suitable means by a grooved collar 151 located on the shaft. It is unnecessary to describe this mechanism in detail as this form of clutch and clutch controller is well known. It will be sufficient to state that the sliding movement of the collar 151 in one direction or the other causes the dogs 152 to move the disk 148 to the right so as to clutch the bevel gear 144 to the shaft or in the opposite direction to release the clutch. This mechanism I term for convenience the "main clutch." The clutch may be moved to active position through a manually operated controller located in front of the front wall or bed-plate of the frame.

*The main controller.*—The controller consists of a handle 153 mounted upon an arm 154 secured to a rockshaft 155 which projects downwardly through the bottom of the frame, as shown in Figs. 1, 4, 17 and 26. Connected to the shaft 155 there is another arm 156 connected by a link 157 with the shorter arm of a bell-crank lever 158, the other arm of which is connected by a link 159 with a two-armed lever 160 (see Figs. 5, 6 and 26). The upper arm of this lever is bifurcated to engage a collar 161 loose on the sliding shaft 66, which, it will be remembered, is utilized for opening and closing the chuck. A collar 1161 is pinned to the shaft, and is normally held against the collar 161 by the spring 69. Also connected to the lever 160 there is a link 162 which extends through the rear wall of the main frame and is coupled to a sliding rod 163 having an arm 164 engaged with the clutch collar 151 of the main clutch. By rocking the controller 153 to the right, to the position shown in Fig. 17, the link 159 will be drawn forwardly so as to rock the lever 160 and through the rod 162 carry the clutch sleeve 151 against the tension of spring 376 to the left in Figs. 5 and 21 so as to clutch the main driving shaft to the prime power shaft. At the same time, the sliding shaft 66 is moved to the right against the tension of the spring 69 so as to disengage the gear 67 from the clutch-operating gear 65. By mechanism which will be subsequently explained, the controller is released by mechanism operated by the cam drum when the machine has completed one cycle of operations, so as to throw out the main clutch.

Turning again to the gear box, as illustrated in Figs. 5, 6, 7, and 17 to 22 inclusive, it will be seen that on opposite sides of the main driving shaft there are what I term the spindle-driving shaft 170 and the drum-driving shaft 171. The end of the shaft 170 has a gear-shaped coupling 172 so that it may be coupled to a shaft section 173 in turn coupled to the shaft 73 in the main frame, which, through the gears 72 and 71, impart rotation to the spindle. This shaft section 173, as shown in Fig. 10, has enlarged ends formed with internal gear teeth to receive the gear members 172 and 174 of the shafts 170 and 73 respectively. I preferably employ this form of coupling as it permits a certain amount of lateral lost motion and does not necessitate the shafts 170 and 73 being placed in an exact alinement. Of course, any other form of coupling may be substituted therefor. In like manner, the shaft 171 is coupled to a shaft section 175 which is in turn coupled to the shaft 125 in the main frame which carries the bevel gear 126 intermeshing with the gear 127 on the worm shaft 124 by which the drum is rotated. By the provision of these coupled shaft sections, the gear box may be detached from the bed without disturbing the relation of the shafts and gears in the gear box. Although the shafts 170 and 171 are arranged on opposite sides of the main drive shaft, nevertheless they are arranged in different horizontal planes for convenience, as shown in Fig. 18.

The main driving shaft 145 is provided with three pinions 176, 177 and 178 of different sizes, with which may be separarately engaged the gears of the sliding cone indicated as a whole at 179 and located on the spindle-driving shaft 170, for driving the latter at any one of three low speeds. The cone gear 179 is keyed upon a sleeve 180 loose on the shaft 170 and has a pickup ratchet clutch mechanism 181 for connecting it with the shaft 170. The shaft 170 is driven at high speed through the gear 182 on the main driving shaft 145 and the gear 183 loose on the shaft 170, but adapted to be clutched thereto by a disk clutch 184 controlled by a sliding collar 185. Said gears 182, 183 are change gears and may be replaced by others having a different ratio. The clutch collar 185 is moved by an arm 186 on a slide 187 which projects forwardly from the gear box and which is pivoted to a two-armed lever 188, 189 pivoted at 190 in the main frame. This arm is operated by a cam on the cam drum or carrier so as to shift the clutch collar 185 and cause the spindle-driving shaft to be driven either at low speed through the cone gear 179 or at high speed through the change gears 182 and 183. A spring 191 on the slide 187 tends to throw the clutch collar 185 to the right so as to throw in the clutch 184. I will subsequently explain how the two-armed lever 188, 189 is locked in the position to which it may be moved by the cam.

The cone gear 179, which furnishes the graduations of low speed of the spindle-driving shaft 170, is moved manually into engagement with any one of the three gears 176, 177, 178, by a slide bar 192 having a yoke 193 engaging the cone gear, as shown in Figs. 5 and 7. This slide projects rearwardly from the end of the gear box, so that it may be easily manipulated.

The drum-driving shaft 171 may be either driven at high speed directly from the main driving shaft 145 or else it may be driven at a slow speed from the spindle-driving shaft, so that the speed of rotation of the drum will be coördinate with or bear a predetermined relation to the speed of rotation of the spindle. To this end, the shaft 171 has loosely mounted thereon a gear 195 which is engaged with the gear 176 on the main driving shaft 145. A toothed clutch 196 mounted to rotate with the shaft 171 may be moved lengthwise thereof so as to engage clutch teeth on the hub of the gear 195 so as to cause rotation of the shaft thereby. When the clutch 196 is closed, the shaft 171 is driven directly from the main driving shaft 145. For the purpose of transmitting power to said shaft 171 from the spindle-driving shaft 170, I employ an intermediate shaft 200 to which power is transmitted from the shaft 170 by a cross shaft 201, as shown in Figs. 18, 20 and 22. This cross shaft is provided with a spiral gear 202 engaging a complemental gear 203 formed on or secured to the spindle-driving shaft 170, and said cross shaft 201 has likewise on its upper end a worm 204 engaging a worm wheel 205 fast on the intermediate shaft 200. Power from the shaft 200 may be transmitted to the drum-driving shaft 171 through either of two trains of gearing, which may be clutched to the shaft 171 when the gear 195 is unclutched therefrom. The first of these two trains consists of the pinion 206 fast on the shaft 200, and the gear 207 loosely mounted on the shaft 171; and the other train comprises the pinion 208 fast on the shaft 200, and the gear 209 loose on the shaft 171. The gears 208, 209 are change gears, and they may be replaced by others, being located at the outer ends of the shafts where access thereto is convenient. Associated with the two gears 207, 209 are ratchet clutches 210, 211, which are unnecessary to explain, but the pawls of which are thrown into and out of action by a rod 212 pinned to the clutch 176. When the clutch 196 is in the position shown in the development in Fig. 21, the gear train 207, 206 connects the drum-driving shaft with the intermediate shaft 200. By moving the rod 212 a step to the right, the gear 210 will be unclutched from the shaft 171, and the gear 209 will be clutched thereto. By moving the rod 212 still farther to the right, the clutch 196 will be engaged with the gear 195 so that the shaft 171 will now be driven from the main driving shaft 145. The clutch may be moved to the left from the position shown to render all three clutches inactive. The clutch 196 and the clutch-operating rod 212 are secured to the shaft 171 by means of an internally toothed sleeve 213 which is secured to the shaft, the internal teeth of which are engaged by teeth formed on the front end of the clutch sleeve 214. Engaged with the clutch sleeve 214 is a yoke 215 formed at the end of an arm 216 on a slide bar 217 as shown in Fig. 5. This slide bar is normally thrust to the right by a spring 218 to cause the clutch 176 to be engaged with the gear 195 so that the shaft 171 will be driven from the main driving shaft. The forward end of the slide 217 is detachably and adjustably connected with the bar or rod 135 which has previously been described in connection with the manually operated lever 132 which throws the shaft 130 into engagement with the bevel gear 125 for the purpose of rotating the drum by hand. The slide 217, however, is automatically shifted into either of the three positions necessary to cause the drum-driving shaft 171 to be driven directly from the main driving shaft or at either of two speeds from the spindle-driving shaft 170. To this end, the rod 135 is connected to the lower end of a two-armed lever 219 pivoted at 220 in the main frame. This lever, as shown in Fig. 5, is in relatively close proximity to the two-armed lever 188,  189 which controls the clutch on the spindle-driving shaft.

The drum or cam-carrier is provided with cams for automatically operating the clutch controllers for the spindle-driving shaft and the drum-driving shaft. This mechanism is shown to the best advantage in Fig. 11. In peripheral grooves, which are provided in the cam drum in the rear end thereof, are placed adjustable cams, as many in number as may be desired, for moving the levers 189 and 219 about their pivots against the tension of the springs 191 and 218 on the controller rods 187 and 217 respectively. These cams are indicated conventionally respectively at 220 and 221. I employ a series of cams 221, inasmuch as the lever 219 may be moved to either of three different positions, whereas the cams 220 are necessary only to insure that the lever 189 will be in either one of two positions. It would be possible to use cam rings extending entirely around the cam drum, such rings having cam edges formed for the particular work to be performed by the machine; but, as I prefer to employ relatively small detached and separately adjustable cam pieces, I have illustrated latches which are also cam controlled for holding the levers 189 and 219 in the several positions to which they may be moved by their respective cams. To the ends of the levers 189 and 219 are pivoted latches 222 and 223. The latch 222 is provided with a dog 224 adapted to engage a stop 225 located on the main frame. The latch 223 has likewise a dog 226 adapted to engage any one of a series of stops 227, likewise on the main frame. By force of gravity, the latches drop into engagement with the stops when they are released, but springs may be connected to them to insure their operation, if desired. It will be apparent that, when the lever 219 in Fig. 11 is moved to the left, the dog 226 may be caused to engage the next adjacent stop to the left so as to hold it in position. The latches, however, are automatically lifted to release the lever by cams 228, 229 respectively placed upon the cam drum in proper position. These cams are adapted to engage pins 230, 231 on the latches. From the foregoing, it is apparent that the clutches in the gear box for the spindle-driving and the drum-driving shafts may be automatically shifted by cams in accordance with any desired sequence of operation into different positions and be there locked by the latches which I have described, and that the latches will be automatically disengaged from their respective stops by cams placed on the drum or cam carrier when it becomes necessary to shift the clutches to different positions.

*Knock-off mechanism.*—There remains now to be described a knock-off mechanism by which the main clutch is moved into inactive position when the machine has completed its cycle of operations. Any suitable knock-off mechanism may be utilized, but, as illustrating one convenient form that I have found satisfactory, I have shown at the front of the frame an upright rockshaft 232 having on its lower end a knife edge adapted to engage a projection 233 on the hand lever 153, see Sheet 12. The rockshaft 232 extends upwardly and has upon its upper end a short lever 234 carrying a crankpin 235 which is in close proximity to the front end of the drum. On the periphery of the drum there is mounted a cam 236 in proper position to rock the shaft 233 so as to release the lever 153 and permit the main clutch to be thrown out by the spring on the slide bar 163, which has been previously explained, so as to stop the rotation of the main driving shaft when the machine has completed a cycle of operations. In order that the main clutch may be thrown out by hand, the pin 233 carried by the controller lever is formed between its ends with a peripheral rib 240 which serves as a fulcrum about which the pin may be laterally tipped in its socket. The inner end of the pin is thrust in one direction by a spring 241 so as to position the outer end of the pin so as to engage the knife edge on the rockshaft 232. To rock the pin in the opposite direction, there is in the lever 153 a small rod 242 which projects from the end of the handle. By pressing the rod 242 inwardly, the pin 232 will be rocked about its peripheral rib 240 so as to disengage its outer end from the knife edge on the rockshaft 232 and thus permit the operator to swing the controller handle and throw out the main clutch, this of course being assisted by the spring which tends normally to open the main clutch.

From the foregoing description which I have given of the various instrumentalities when referring to their construction and mode of operation, the operation of the machine as a whole will be easily understood without further explanation. I have already explained that, inasmuch as the operation of the tools upon the work, whether in sequence or simultaneously, and whether the operation consists of forming, facing, reaming or turning, depends upon the character of the work to be produced, and as the speed of rotation of the cam shaft, which is increased during the idle movements of the tools and decreased when the tools are acting, is controlled by cams which will vary according to circumstances, I have shown the various cams only conventionally. It will be recognized, however, by persons skilled in the art, that the machine may be put to many uses, particularly where the pieces of work of a given character are to be produced in such large number that the expense of camming is justified, and that the cams will be formed and located to secure the operation desired. In this way, the machine has many advantages over so-called special machines which are designed only on blanks of a predetermined formation, such as piston rings and the like.

Another decided advantage of the present invention resides in the fact that the change-speed gearing for the spindle and the cam is located out of the main frame in a separate box or casing which is detachable as a whole in case of injuries to any of the parts and replaceable by a like gear box. This arrangement of the change-speed gearing outside of the main frame greatly simplifies the construction of the parts within the frame and permits the arrangement of such parts so that they are easily accessible for repairs or for adjustment. In this connection, it will be noted that the major part of the cam carrier or drum is exposed at the top and rear of the machine where the cams may be positioned or adjusted with ease. The machine is narrow, so that a plurality of them can be grouped and coupled together as previously explained and as shown in Fig. 25; in addition, the work and tools are so placed that there is no obstruction to the perfect observation of the operations at all times; and, furthermore, as in the machine described in my previous application to which reference has been hereinbefore made, the work spindle and the tool slides are arranged at an inclination in parallelism with the natural line of vision of an operator standing in front of the machine.

I have illustrated all the cams controlling the automatic operation of the machine as being mounted on a single cam drum or cam carrier, but, of course, it will be recognized that it would be no departure from my invention if the cams were otherwise arranged. So far as the several separate features of the invention are concerned, they may be used separately in other forms of machine, and many changes and variations in the several mechanisms may be made without departing from the spirit and scope of the invention broadly considered and claimed. In addition, it will be noted that, while the machine which I have herein illustrated and described as constituting one embodiment of the invention is more particularly adapted for what is known as chucking work, that is, for operating upon detached pieces of work such as gear blanks which are held in a chuck, the machine by employing other forms of work holder may be used for bar work, in which event it would be desirable to locate the frame and the gear box upon a horizontal instead of an inclined bed and to dispense with the use of the tool slide within the spindle, so as to permit long bars to be fed through the spindle.

What I claim is:

1. A lathe comprising two separable components, one consisting of a frame having a work spindle and a cam carrier, and the other consisting of a frame having a constant speed drive shaft, a driven shaft and intervening variable speed power-transmitting mechanism, in combination with separable operative connections between said driven shaft and said spindle and cam carrier, and means operated by the cam carrier for controlling the operation of said variable speed power-transmitting mechanism.

2. A lathe comprising a main frame having a work holder, a tool holder, and cams for controlling the operation of said holders, said cams and work holder being rotatable together at different ratios and also independently of each other, and a single detachable gear box containing change speed mechanism including a clutch-controlled shaft for actuating the work and a clutch-controlled shaft for actuating said cams, and means on the frame for automatically controlling said clutches.

3. A lathe comprising a base, a main frame having a rotatable work holder, and a gear box having a constant speed drive shaft and variable speed power-transmitting mechanism for the work holder, said frame, box and base being detachably connected together, in combination with means on the main frame for automatically controlling the variable speed mechanism.

4. A lathe comprising a base, a main frame supported on the front end thereof and having a rotatable work holder and a cam carrier, a gear box detachably supported on the rear end thereof and having variable speed power-transmitting mechanism for rotating said work holder at different speeds, and means operated by the cam carrier for controlling the said variable speed mechanism.

5. A lathe comprising a main frame having a rotary work holder, a gear box containing a driving shaft and variable speed power-transmitting mechanism for driving said work holder at different speeds, means for detachably connecting them in spaced relation, and means on the main frame for controlling the operation of the variable speed mechanism.

6. A lathe comprising a base, a main frame supported by said base and having a work spindle, a cam carrier, and a tool holder, a gear box supported on said base independently of the main frame and having a prime power shaft and variable speed power-transmitting mechanism operated thereby, operative separable connections between said mechanism and said spindle to drive the latter at different speeds, and separable means extending between the main frame and the gear box for controlling the operation of the variable speed mechanism.

7. A lathe comprising a base, a main frame supported by said base having a work spindle, a tool holder, and a feed shaft for the tool holder, a gear box supported on said base independently of the main frame and having a prime power shaft and variable speed power-transmitting mechanism operated thereby, operative separable connections between said mechanism and said feed shaft, and cam mechanism on the main frame for controlling the operation of said variable speed mechanism.

8. A lathe comprising a base, a main frame supported by said base having a work spindle, a tool holder, and a feed shaft for the tool holder, a gear box supported on said base independently of the main frame and having a prime power and variable speed power-transmitting mechanism operated thereby, operative separable connections between said mechanism and said spindle and feed shaft, and cam mechanism on the main frame for controlling the operation of said variable speed mechanism.

9. A lathe comprising a main frame having a work holder, a tool holder, and cam mechanism for operating the tool holder, a gear box containing change speed mechanism and detachable from the main frame, and detachable couplings connecting the change speed mechanism with the work holder and the cam mechanism.

10. A lathe comprising a main frame having a work spindle, a spindle shaft, a tool holder, a cam carrier, and a shaft for rotating the cam carrier; a separate gear box held in spaced relation to the main frame and having a carrier-driving shaft, a spindle-driving shaft, and change speed mechanism for rotating said shafts at different speeds; and means for coupling the said shafts of the frame with the corresponding shafts of the gear box.

11. A lathe comprising a main frame, a gear box, and means for connecting the same together; said main frame being provided with a work holder, a tool holder, and a cam carrier for operating the tool holder; said gear box being provided with a spindle-driving shaft, a cam-carrier driving shaft parallel thereto, and change speed mechanism including clutches for driving said shafts at different speeds; in combination with means for transmitting power from said shafts to the spindle and cam carrier respectively, and means operated by said cam carrier on the main frame for shifting said clutches in the gear box.

12. A lathe comprising a main frame provided with a work holder, a tool holder, a bed supporting said frame, and a cam carrier; a gear box supported on said bed in spaced relation to said frame and provided with change speed mechanism, detachable connections for transmitting power from the change speed mechanism to the instrumentalities of the main frame, and means for detachably securing the gear box on said bed.

13. A lathe comprising a work spindle, a tool holder, a cam shaft for operating the tool holder, and a frame on which said instrumentalities are operatively supported, and a detachable gear box having speed-changing mechanism for imparting movement to said spindle and said cam shaft, comprising a variable-speed shaft for driving the cam shaft and a variable-speed shaft for driving the spindle.

14. In a lathe, the combination with the operative instrumentalities thereof, of a separable gear box having a prime power shaft and change speed mechanism therein, couplings for connecting said change speed mechanism to said operative instrumentalities, and means on the lathe and external to the gear box for controlling the operation of the change speed mechanism.

15. In a lathe the combination with a frame, and a spindle and a spindle-driving shaft both mounted on said frame, of a separable gear box having a constant speed drive shaft, a driven shaft, and intervening variable-speed power-transmitting mechanism, separable means for operatively connecting said driven shaft with said spindle-driving shaft, a cam shaft on the said frame, and means operated by said cam shaft for controlling the operation of said variable-speed mechanism.

16. In a lathe, the combination with a spindle, of a separable gear box having a constant speed drive shaft and variable speed power-transmitting mechanism driven thereby, separable means for operatively connecting said mechanism with said spindle, a cam shaft, and means operated by said shaft for controlling the operation of said variable speed mechanism.

17. In a lathe, the combination with a frame and a shaft thereon, of a detachable gear box, having a prime power shaft, a driven shaft normally alined with the shaft on the main frame, differential speed power-transmitting mechanism between said power shaft and said driven shaft, and a coupling detachably connecting said driven shaft with the shaft on the frame.

18. In a lathe, the combination with a frame having a spindle and a shaft for operating the tool holder; of a separate gear box having a prime power shaft, a shaft for transmitting power to the spindle, a shaft for transmitting power to the tool-holder-operating shaft, change speed mechanism between the prime power shaft to the third mentioned shaft, change speed mechanism between the prime power shaft and the fourth mentioned shaft; and means on the main frame for automatically controlling said change speed mechanisms on the gear box.

19. In a lathe, the combination with a frame having a spindle-driving shaft and a shaft for transmitting power to a tool holder; of a separate gear box having a prime power shaft, shafts corresponding to the first two mentioned shafts and change speed mechanism between the prime power shaft and the second two mentioned shafts; and couplings connecting the first two mentioned shafts with the second two mentioned shafts respectively.

20. In a lathe, the combination with a frame having a spindle-driving shaft and a shaft for transmitting power to a tool holder; of a separate gear box having a prime power shaft, shafts corresponding to the first two mentioned shafts and change speed mechanism between the prime power shaft and the second two mentioned shafts; couplings connecting the first two mentioned shafts with the second two mentioned shafts respectively, and means on the main frame for controlling the change speed mechanism on the gear box.

21. In a lathe, the combination with a frame having a spindle-driving shaft and a shaft for transmitting power to a tool holder; of a separate gear box having shafts alined with the first mentioned shafts and detachably connected thereto, a prime power shaft, and change speed mechanism connecting the second mentioned shafts with the prime power shaft.

22. In a lathe, the combination with a main frame having a tool slide, a cam carrier for operating the tool slide, and a shaft for rotating said carrier; of a separate gear box having a driven shaft alined with and connected to said first-mentioned shaft, a main drive shaft, and change speed mechanism between said main drive shaft and said driven shaft; and a separable coupling means connecting said first-mentioned shaft and said driven shaft.

23. In a lathe, the combination with a main frame having a work spindle, a spindle shaft, and a cam carrier, of a separate gear box having a spindle-driving shaft connected to said spindle shaft, speed-changing mechanism including a clutch for driving said spindle-driving shaft at different speeds, and clutch-controlling means operated by said cam carrier on the main frame.

24. In a lathe, the combination with a main frame having a work spindle, a spindle shaft and a cam carrier all journaled thereon, of a separate gear box having a spindle-driving shaft alined with and detachably connected to said spindle shaft, speed changing mechanism including a clutch for driving said spindle-driving shaft at different speeds, and clutch-controlling means operated by said cam carrier on the main frame and consisting of separable portions whereby said gear box may be detached from the main frame.

25. A metal working machine comprising the combination with a tool slide, a work spindle, a feed shaft and a main frame supporting said instrumentalities, of a variable speed power-transmitting mechanism including a spindle-driving shaft and a shaft for driving the feed shaft, and a separable gear box or casing supporting said power-transmitting mechanism.

26. A metal working machine comprising the combination with a tool slide, a work spindle, a feed shaft and a main frame supporting said instrumentalities, of a variable speed power-transmitting mechanism including a spindle-driving shaft and a shaft for driving the feed shaft, a separable gear box or casing supporting said power-transmitting mechanism, and means for detachably connecting the feed shaft and its said driving shaft.

27. In a lathe, the combination with a main frame having a work spindle, a reciprocatory and oscillatory tool holder, a cam carrier for reciprocating and oscillating the tool holder, and a cam shaft whose axis is parallel with that of the cam carrier; of a separate gear box having a cam-driving shaft alined with and detachably connected to the cam shaft, a main drive shaft, and change speed mechanism between said main drive shaft and said cam-driving shaft.

28. In a lathe, the combination with a main frame having a work spindle, a reciprocatory and oscillatory tool holder, a cam carrier for reciprocating and oscillating the tool holder, and a cam shaft whose axis is parallel with that of the cam carrier; of a separate gear box having a cam-driving shaft alined with and detachably connected to the cam shaft, speed-changing mechanism including a clutch for driving said cam driving shaft at different speeds, and clutch-controlling means operated by said cam carrier on the main frame.

29. In a lathe, the combination with a main frame having a work spindle, a tool holder, a cam carrier for operating the tool holder, and a cam shaft; of a separate gear box detachable from the main frame having a cam-driving shaft detachably connected to the cam shaft, change speed mechanism including clutch devices for driving the cam-driving shaft at different speeds, clutch-controlling means operated by the cam carrier and formed in separable portions, which may be separated to permit the detachment of the gear box.

30. In a lathe, the combination with a cam carrier, a shaft for rotating the same, power-operated mechanism for rotating said shaft including a clutch, a clutch controller, and means connected to the clutch controller for manually rotating the shaft.

31. In a lathe, the combination with a cam carrier, a shaft for rotating the same, a manually rotatable shaft normally disconnected from the shaft for rotating it, power mechanism including a clutch for rotating the first-mentioned shaft, a clutch controller and connections between the clutch controller and the manually rotatable shaft, whereby said manually rotatable shaft is inoperative except when the clutch is inactive.

32. In a lathe, the combination with a spindle having a chuck, power mechanism including a clutch for rotating the spindle, and a clutch controller, of manually operated means for opening and closing the chuck, and connections between said clutch controller and said normally operated means.

33. In a lathe, the combination with a spindle having a chuck, power mechanism including a clutch for rotating the spindle, and a clutch controller, of manually operated means for opening and closing the chuck normally disconnected from the chuck, and means connected with the clutch controller for preventing the operation of said manually operated means except when said clutch is inactive.

34. In a lathe, the combination with a spindle, a spindle-driving shaft, a cam carrier and a driving shaft therefor, of change speed mechanism for driving said shafts at different speeds including clutches on said shafts, a controller for each of said clutches, and cams on said cam carrier for automatically operating said controllers.

35. In a lathe, the combination with a spindle, a spindle-driving shaft, a cam carrier and a driving shaft therefor, of change speed mechanism for driving said shafts at different speeds including clutches on said shafts, a controller for each of said clutches, cams on said cam carrier for automatically moving said controllers, and cam-controlled means for locking said controllers in position.

36. In a lathe, the combination with a spindle, a spindle-driving shaft, a cam carrier and a driving shaft therefor, of change speed mechanism for driving said shafts at different speeds including clutches on said shafts, a controller for each of said clutches, a pivoted arm connected to each controller, cams on said carrier for actuating said arms, latches on said arms for holding them in position, and cams on said carrier for releasing said latches.

37. In a lathe, a spindle, a spindle-driving shaft, a cam carrier, a carrier-driving shaft, a main driving shaft, clutch-controlled gearing between said driving shaft and said first mentioned shaft, an intermediate shaft driven by said spindle-driving shaft, clutch-controlled gearing between said intermediate shaft and said carrier-driving shaft, and controllers for actuating the several clutches, and cams on the carrier for automatically operating said controllers.

38. In a lathe, a spindle, a spindle-driving shaft, a cam carrier, a carrier-driving shaft, a main driving shaft, a clutch mechanism for the main driving shaft, change speed gearing including a clutch mechanism between the main drive shaft and the spindle-driving shaft, an intermediate shaft driven by the spindle-driving shaft, change speed gearing including a clutch mechanism between the carrier-driving shaft and the intermediate and main driving shafts, controllers for said clutch mechanisms, and cams on the carrier for automatically operating all of said controllers.

39. In a lathe, a work holder, a tool holder adapted both to oscillate and to axially reciprocate, a slide bar for the tool holder, a cam carrier, a lever actuated by cams on the carrier and engaged with said slide bar for axially reciprocating it, a rockshaft rocked by cams on said carrier, and engaging arms on said rockshaft and slide for imparting the oscillating movement of said rockshaft to said slide bar.

40. In a lathe, a work holder, a tool holder adapted both to oscillate and to axially reciprocate, a slide bar for the tool holder, a cam carrier, a rockshaft oscillated by cams on said carrier, and having an arm, and an arm on said slide bar engaging the rockshaft arm, whereby the oscillating movement of the rockshaft is imparted to the slide bar and tool holder.

41. In a lathe, a work holder, a tool holder adapted both to oscillate and to axially reciprocate, a slide bar for the tool holder, a cam carrier, cam-operated means for axially reciprocating said slide bar, a rockshaft oscillated by cams on said carrier, and having an arm, an arm on said slide bar engaging the rockshaft arm, whereby the oscillating movement of the rockshaft is imparted to the slide bar and tool holder, one of said arms having at its end a slideway to receive the other arm.

42. In a lathe, a spindle-driving shaft, a cam-driving shaft, a main driving shaft, a main clutch on the main driving shaft, differential speed mechanism including a clutch between said main driving shaft and each of the other said shafts, and automatic cam-controlled mechanism for controlling the operation of all of said clutches.

43. In a lathe, a cam carrier arranged to receive cams, power mechanism for rotating said cam carrier, a shaft normally disconnected from the cam carrier and arranged to be rotated manually, and means for connecting said shaft to said cam carrier to cause the manual rotation of said carrier.

44. In a lathe, the combination with a spindle, a spindle-driving shaft, a variable speed mechanism for rotating said shaft at different speeds, and a controller for said speed mechanism, of cam-actuated mechanism for moving said controller, and cam-controlled latch mechanism for holding said controller in position after being moved by said cam-actuated mechanism.

45. In a lathe, the combination with a tool carrier, a shaft from which movement is imparted to said tool carrier, a variable speed mechanism for rotating said shaft at different speeds and a controller for said shaft, of cam-actuated mechanism for moving said controller, and cam-controlled latch mechanism for holding said controller in position after being moved by said cam-actuated mechanism.

46. A lathe comprising a base structure, a main frame at the front end of said base structure and supporting the spindle and tool carrier, and a gear box supported on said base structure in the rear of said main frame and containing a drive shaft and variable speed mechanism for controlling the operation and speed of movement of said spindle and tool carrier.

47. A lathe comprising a base of which the top extends rearwardly and downwardly, a main frame on the front end of the base, and having a work spindle which is rearwardly and downwardly inclined, and a gear box on the base in the rear of the main frame and containing a drive shaft, and variable speed power-transmitting mechanism driven thereby for imparting different speeds of rotation to the work spindle.

48. A lathe comprising a base whose top is rearwardly and downwardly inclined, a main frame on the front end of the base and having a work spindle and a tool slide substantially in parallelism with the top of the base, and a gear box on the base in the rear of the main frame and containing variable speed power-transmitting mechanism for imparting power to the work spindle and the tool slide through appropriate connections.

49. In a lathe, the combination with a work spindle, a tool slide and a cam shaft, a framework for supporting the same, of a variable speed power-transmitting mechanism comprising driving and driven shafts and clutch-controlled trains of gearing, a removable box or casing therefor for operatively supporting said shafts in permanent relation, separable controlling devices for the variable speed mechanism operated by the cam shaft, and separable connections between said driven shaft and said work spindle.

50. In a lathe, the combination with a work spindle, a tool slide and a cam shaft, a framework for supporting the same, of a variable speed power-transmitting mechanism comprising driving and driven shafts and clutch-controlled trains of gearing, a removable box or casing therefor for operatively supporting said shafts in permanent relation, separable controlling devices for the variable speed mechanism operated by the cam shaft, and separable connections between said driven shaft and said cam shaft.

In testimony whereof I have affixed my signature in presence of two witnesses.

JAMES HARTNESS.

Witnesses:
J. W. BENNETT,
GEORGE A. PERRY.